(12) United States Patent
Yasukawa et al.

(10) Patent No.: US 10,778,380 B2
(45) Date of Patent: Sep. 15, 2020

(54) USER EQUIPMENT AND RETRANSMISSION CONTROL METHOD

(71) Applicant: NTT DOCOMO, INC., Tokyo (JP)

(72) Inventors: Shinpei Yasukawa, Tokyo (JP); Satoshi Nagata, Tokyo (JP); Kazuki Takeda, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 16/323,565

(22) PCT Filed: Aug. 9, 2017

(86) PCT No.: PCT/JP2017/028994
§ 371 (c)(1),
(2) Date: Feb. 6, 2019

(87) PCT Pub. No.: WO2018/030487
PCT Pub. Date: Feb. 15, 2018

(65) Prior Publication Data
US 2019/0181990 A1 Jun. 13, 2019

(30) Foreign Application Priority Data
Aug. 10, 2016 (JP) .................. 2016-158263

(51) Int. Cl.
*H04L 1/18* (2006.01)
*H04W 28/04* (2009.01)
(Continued)

(52) U.S. Cl.
CPC .......... *H04L 1/1819* (2013.01); *H04L 1/0013* (2013.01); *H04L 1/18* (2013.01); *H04W 28/04* (2013.01); *H04W 72/042* (2013.01)

(58) Field of Classification Search
CPC ....... H04L 1/1819; H04L 1/0013; H04L 1/18; H04W 28/04
See application file for complete search history.

(56) References Cited

U.S. PATENT DOCUMENTS

2007/0106924 A1* 5/2007 Seidel .................. H04L 1/1845
714/748
2010/0296427 A1* 11/2010 Lohr ..................... H04L 1/1822
370/312
(Continued)

FOREIGN PATENT DOCUMENTS

JP   2007-028653 A   2/2007
JP   2012-235454 A   11/2012
(Continued)

OTHER PUBLICATIONS

International Search Report issued in PCT/JP2017/028994 dated Oct. 31, 2017 (2 Pages).
(Continued)

*Primary Examiner* — Jael M Ulysse
(74) *Attorney, Agent, or Firm* — Osha Liang LLP

(57) ABSTRACT

A user equipment in a radio communication system including a base station and the user equipment, the user equipment including: a storage unit that includes a soft buffer region that is used in a retransmission control of downlink data that is received from the base station; and a retransmission control unit that divides a partial region of the soft buffer region into a plurality of sub-buffer regions, and performs the retransmission control of the downlink data that is received from the base station by using one or a plurality of sub-buffer regions among the plurality of sub-buffer regions.

4 Claims, 14 Drawing Sheets

(51) Int. Cl.
*H04L 1/00* (2006.01)
*H04W 72/04* (2009.01)

(56) References Cited

U.S. PATENT DOCUMENTS

| | | | |
|---|---|---|---|
| 2012/0188952 A1* | 7/2012 | Baldemair | H04L 5/001 370/329 |
| 2013/0051269 A1* | 2/2013 | Suzuki | H04L 1/1877 370/252 |
| 2013/0051289 A1* | 2/2013 | Hsieh | H04L 1/1845 370/280 |
| 2013/0176981 A1 | 7/2013 | Earnshaw et al. | |
| 2014/0071954 A1 | 3/2014 | Au et al. | |
| 2014/0161090 A1* | 6/2014 | Lee | H04L 1/1822 370/329 |
| 2014/0204892 A1* | 7/2014 | Oizumi | H04L 5/1469 370/329 |
| 2015/0207595 A1* | 7/2015 | Oizumi | H04W 72/02 370/329 |
| 2016/0056926 A1* | 2/2016 | Li | H04L 5/0044 370/280 |

FOREIGN PATENT DOCUMENTS

| | | |
|---|---|---|
| JP | 2014-502080 A | 1/2014 |
| WO | 2015/112731 A2 | 7/2015 |

OTHER PUBLICATIONS

Written Opinion of the International Searching authority issued in PCT/JP2017/028994 dated Oct. 31, 2017 (4 Pages).
LG Electronics; "Control signalling error requirement depending on eNode B DTX detection" 3GPP TSG RAN WG1 #50bis, R1-074207, Shanghai, China, Oct. 8-12, 2007 (3 Pages).
3GPP TS 36.321 V13.2.0; "3rd Generation Partnership Project; Technical Specification Group Radio Access Network; Evolved Universal Terrestrial Radio Access (E-UTRA); Medium Access Control (MAC) protocol specification (Release 13)"; Jun. 2016 (91 Pages).

* cited by examiner

FIG.8
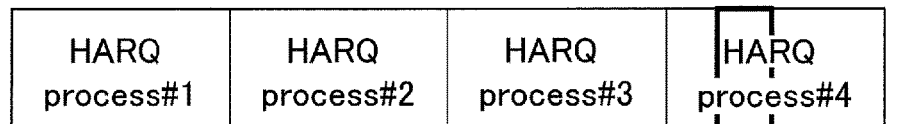
FIG.9
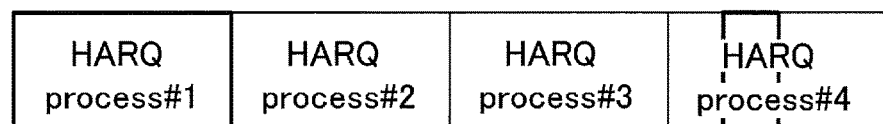
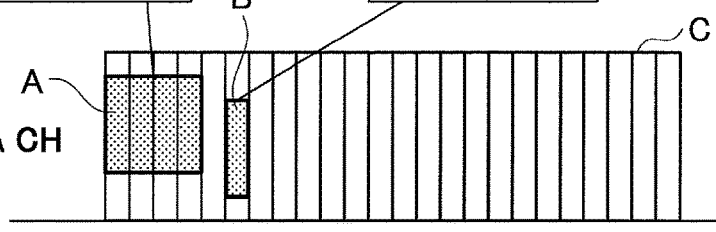

USER EQUIPMENT AND RETRANSMISSION CONTROL METHOD

TECHNICAL FIELD

The present invention relates to a user equipment in a radio communication system.

BACKGROUND ART

Currently, in a $3^{rd}$ generation partnership project (3GPP), a next generation system, which corresponds to a successor of long term evolution (LTE)-advanced as one of fourth generation radio communication systems and is called 5G, has been examined. In the 5G, three use cases including an extended mobile broadband (eMBB), a massive machine type communication (mMTC), and an ultra reliability and low latency communication (URLLC) are mainly assumed.

The URLLC is aimed at realization of a radio communication with low latency and high reliability. In the URLLC, as a specific plan for realization of low latency, introduction of a short transmission time interval (TTI) length (also referred to as a subframe length, a subframe interval, or a transmission time interval), shortening of control latency from packet generation to data transmission, and the like have been examined. In addition, as a specific plan for realization of high reliability in the URLLC, introduction of a coding mode with a low coding rate and a modulation mode for realization of a low bit error rate, utilization of diversity, and the like have been examined.

In addition, in the URLLC, for example, realization of U-plane latency of 1 ms and a packet error rate of, for example, $10^{-5}$ has been examined. Shortening of the TTI length in comparison to a typical packet (for example, a packet of an eMBB traffic) has been examined to realize low latency.

In the 5G, it is considered that the eMBB traffic and a URLLC traffic are mixed in a user equipment. In this case, the TTI length of the URLLC is shorter in comparison to the eMBB, and thus URLLC data may be transmitted in higher frequency in comparison to the eMBB.

Here, in the 5G, as is the case with LTE, it is assumed that a transmission control called hybrid ARQ (HARQ) (refer to Non-Patent Document 1), which efficiently guarantees a packet error that occurs in a radio section at a short control latency time, is performed.

CITATION LIST

Non-Patent Document

Non-Patent Document 1: 3GPP TS 36.321 V13.2.0 (2016-06)

SUMMARY OF THE INVENTION

Problem to be Solved by the Invention

With regard to the HARQ control, for example, when a ratio of the TTI length between the eMBB and the URLLC is assumed as 4:1, it is possible to allocate 4HARQ processes to the URLLC during allocation of 1HARQ process to the eMBB. A soft buffer is used for each HARQ process, but the soft buffer is limited to a soft buffer region in the user equipment. Accordingly, in a case where the eMBB data and the URLLC data are mixed in the user equipment, the soft buffer region becomes deficient, and thus there is a problem that the number of the HARQ processes which can be used for the eMBB may be limited.

Furthermore, there is also a problem that the above-described problem may occur in a case where a plurality of kinds of communications are mixed in the user equipment without limitation to the eMBB and the URLLC.

The invention has been made in consideration of the above-described circumstances, and an object thereof is to provide a technology capable of avoiding deficiency of a soft buffer region that is used in a retransmission control in a user equipment that performs processing of a plurality of kinds of communications.

Means for Solving Problem

According to a technology that is disclosed, there is provided a user equipment in a radio communication system including a base station and the user equipment. The user equipment including: a storage unit that includes a soft buffer region that is used in a retransmission control of downlink data that is received from the base station; and a retransmission control unit that divides a partial region of the soft buffer region into a plurality of sub-buffer regions, and performs the retransmission control of the downlink data that is received from the base station by using one or a plurality of sub-buffer regions among the plurality of sub-buffer regions.

Effect of the Invention

According to the technology that is disclosed, it is possible to provide a technology capable of avoiding deficiency of a soft buffer region that is used in a retransmission control in a user equipment that performs processing of a plurality of kinds of communications.

BRIEF DESCRIPTION OF DRAWINGS

FIG. 8 is a view illustrating an example of designation of the soft buffer region;

FIG. 9 is a view illustrating an example of designation of the soft buffer region;

MODE(S) FOR CARRYING OUT THE INVENTION

Hereinafter, an embodiment (this embodiment) of the invention will be described with reference to the accompanying drawings. Furthermore, the following embodiment to be described below is illustrative only, and an embodiment to which the invention is applied is not limited to the following embodiment.

It is assumed that a radio communication system of this embodiment supports at least an LTE communication mode. Accordingly, an existing technology defined in the LTE can be appropriately used in an operation of the radio communication system. However, the existing technology is not limited to the LTE. In addition, it is assumed that "LTE" in this specification has broad meaning including LTE-Advanced, and a mode (for example, 5G) subsequent to the LTE-Advanced unless otherwise stated. In addition, the invention is also applicable to a communication mode other than the LTE.

In addition, in the following embodiment, as a plurality of kinds of communications which are different in a TTI length, a communication of the eMBB and a communication of the URLLC are exemplified. However, these communications are illustrative only, and the invention is also applicable to communications other than the communication of the eMBB and the communication of the URLLC. In addition, the number of types of communications which are mixed in is not limited two. In addition, the number of types of communications which are mixed in may be three or greater.

(Whole Configuration of System)

Figure 1:
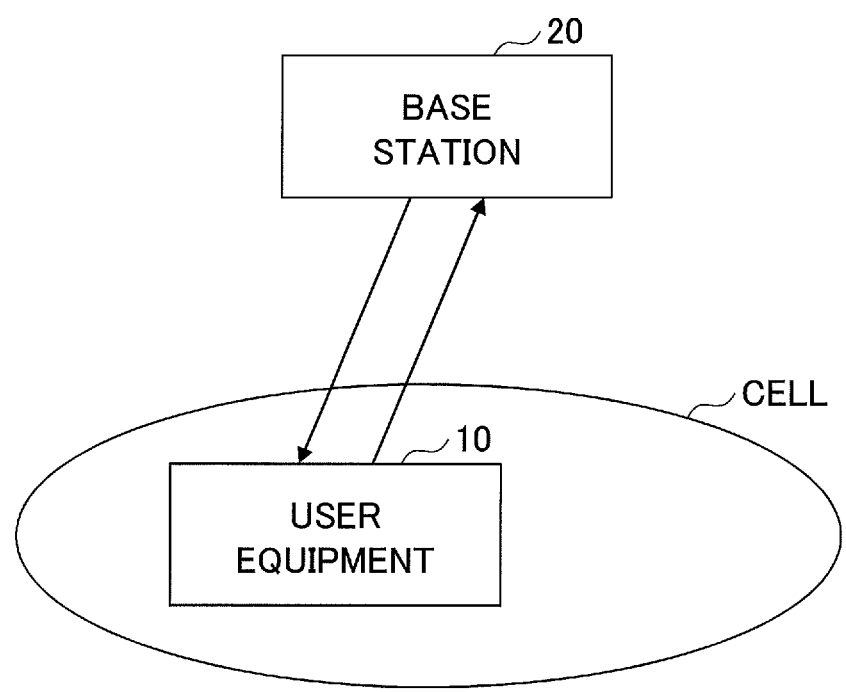
FIG. 1 is a configuration diagram of a radio communication system according to an embodiment of the invention.

FIG. 1 is a configuration diagram of a radio communication system according to this embodiment. As illustrated in FIG. 1, the radio communication system according to this embodiment includes a user equipment 10 and a base station 20. In FIG. 1, the user equipment 10 and the base station 20 are illustrated one by one, but this is illustrative only. A plurality of the user equipments 10 and a plurality of the base stations 20 may be respectively provided.

In this embodiment, a HARQ control when the user equipment 10 receives downlink data is set as a target.

The HARQ control described in this embodiment is basically the same as a HARQ control in LTE. Accordingly, first, an overview of the HARQ control in the LTE will be described.

In the user equipment and the base station in the LTE, a hybrid ARQ (HARQ) control is performed in a HARQ entity of a media access control (MAC) layer (Non-Patent Document 1). In the HARQ control with respect to downlink data to the user equipment, in a case where decoding of the downlink data (transport block: TB) succeeds, ACK is returned to the base station, and in a case where decoding fails, NACK is returned to the base station. In this manner, in the HARQ, ACK or NACK is transmitted to perform a retransmission control. In the HARQ, in a case where the decoding of data that is received fails (in a case where the data is erroneous), the user equipment retains the data, combines data that is retransmitted from the base station and the data that is retained (soft combining), and decodes the resultant combined data. According to this, strong resistance against error is provided. A storage unit (memory region) that retains the data is referred to as a soft buffer.

In addition, the HARQ control with respect to one transport block is referred to as a HARQ process. In the HARQ control, a parallel operation with respect to a plurality of transport blocks is possible. For example, in a case of performing the HARQ parallel operation with respect to eight transport blocks, eight HARQ processes including a HARQ process #1 to a HARQ process #8 operate. The user equipment includes a soft buffer for each of the HARQ processes.

(Basic Operation Example)

In this embodiment, soft buffers of the entirety of HARQ processes for an eMBB with a long TTI length are referred to as a master soft buffer, and it is assumed that a soft buffer of a part of the HARQ processes in the master soft buffer is used as a soft buffer for a URLLC. The soft buffer that is used for the URLLC is referred to as a slave soft buffer. For example, the slave soft buffer is used after being divided into the number of HARQ processes for the URLLC. Furthermore, "master" and "slave" are used for convenience of explanation, and are not intended to represent that the eMBB and the URLLC have a parent-child relationship.

Figure 2:
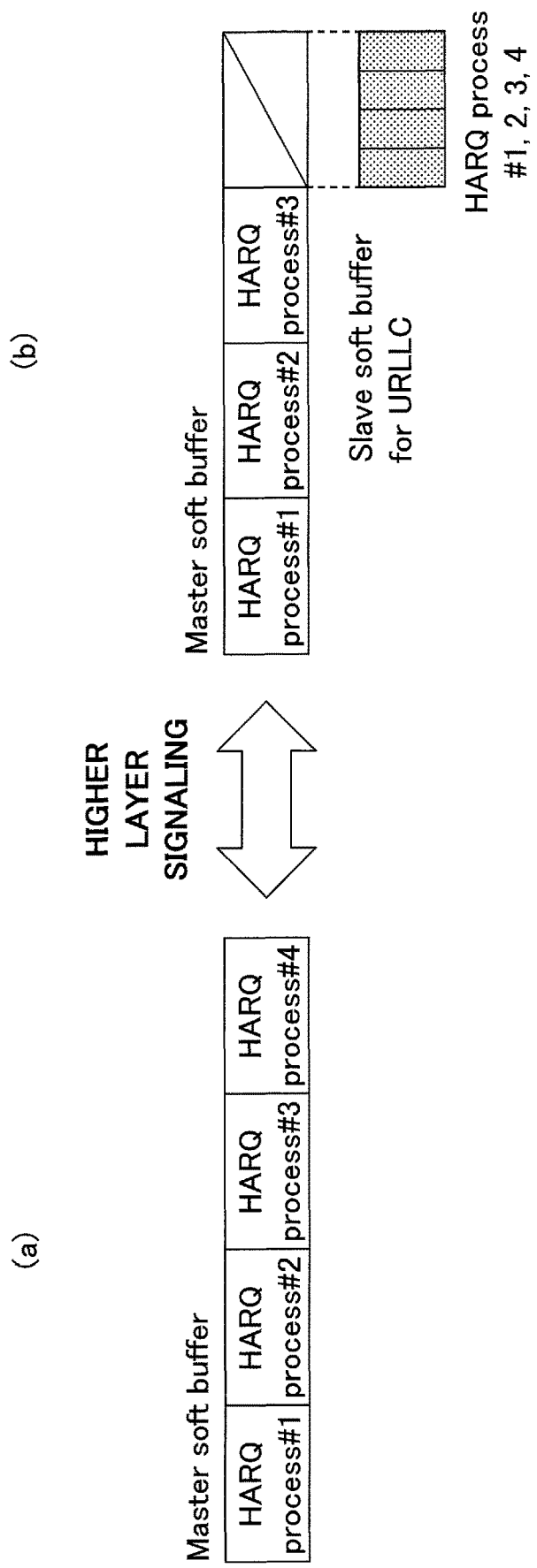
FIG. 2 is a view illustrating an example of a soft buffer.

FIG. 2 illustrates an example of the soft buffer that is provided to the user equipment 10. FIG. 2(a) illustrates the master soft buffer. In this embodiment, the user equipment 10 can use four HARQ processes for the eMBB, and thus respective soft buffers for the HARQ processes #1 to #4 are provided as illustrated in FIG. 2(a).

FIG. 2(b) illustrates a soft buffer status in a case where the soft buffer of the HARQ process #4 in the master soft buffer is used as the slave soft buffer. Here, since the four HARQ processes are used for the URLLC, the slave soft buffer is divided into four pieces.

Figure 3:
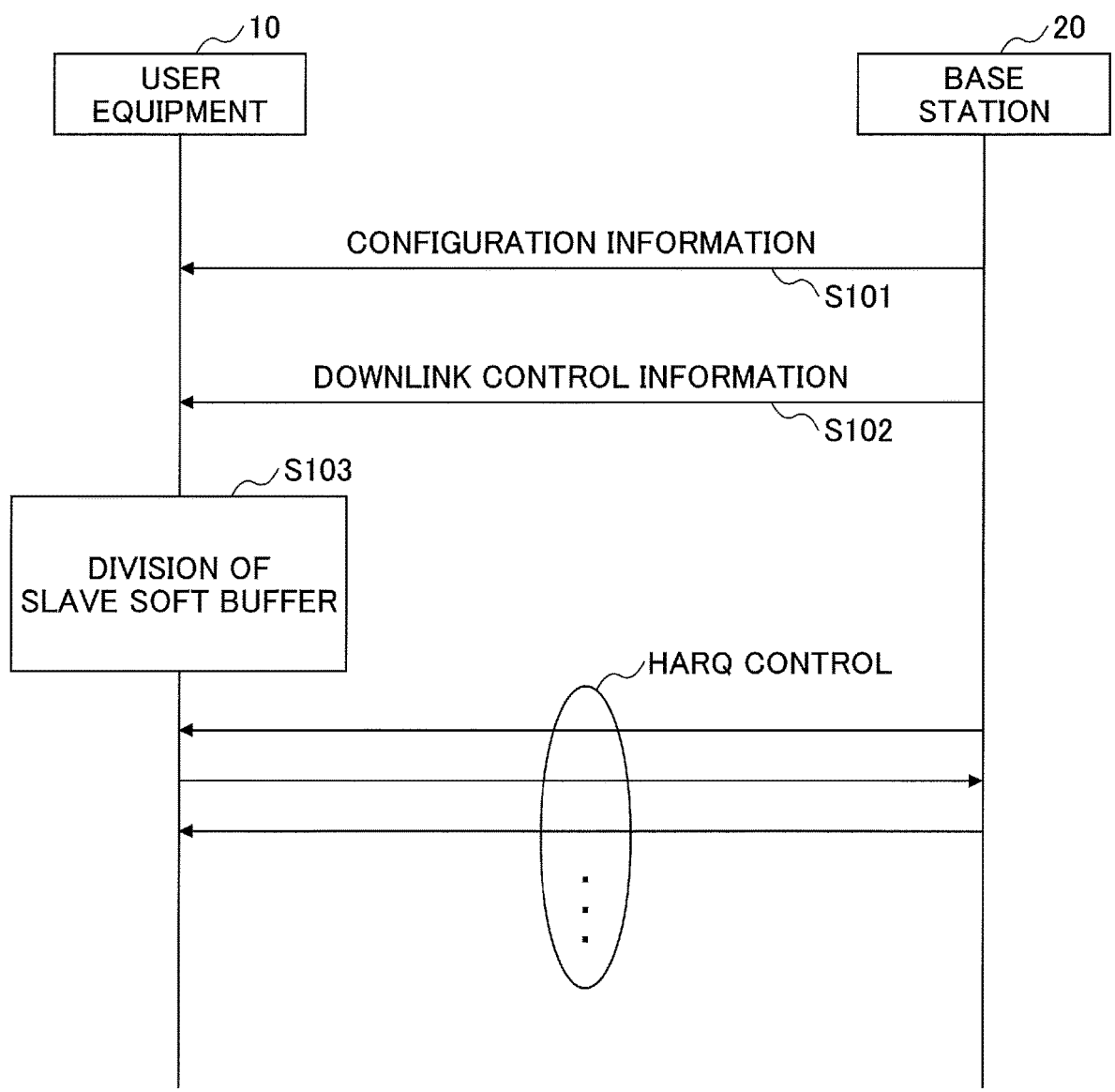
FIG. 3 is a view illustrating a basic operation example of the radio communication system.

For example, setting of using a partial soft buffer in the master soft buffer as the slave soft buffer is performed by higher layer signaling with respect to the user equipment 10 from the base station 20. FIG. 3 illustrates a basic system operation example including the higher layer signaling.

In step S101 in FIG. 3, from the base station 20 to the user equipment 10, configuration information is transmitted, by higher layer signaling, indicating to divide a soft buffer of a specific HARQ process in the master soft buffer and to use the soft buffer as the slave soft buffer.

For example, a number (=an HARQ process number) of a soft buffer, which is used as the slave soft buffer, in the master soft buffer, and a division number (=the number of HARQ processes of the URLLC) of the slave soft buffer are notified by the configuration information. Furthermore, in a case where the number of the soft buffer, which is used as the slave soft buffer, in the master soft buffer is determined in advance, designation of the number may not be included. In addition, instead of or in addition to the division number (the number of the HARQ processes of the URLLC) of the slave soft buffer, a buffer size (=one transport block size) per one HARQ process of the URLLC in the slave soft buffer may be designated. In addition, instead of the number (=an HARQ process number) of the soft buffer, which is used as the slave soft buffer, in the master soft buffer, a buffer size and/or region designating information (for example, an address range of a memory) of a master soft buffer that is used as the slave soft buffer may be designated.

The user equipment 10 performs partitioning setting of the slave soft buffer on the basis of the configuration information. For example, the partitioning setting is intended to secure a memory region that is used for the slave soft buffer, and to retain the division number in a storage unit (a predetermined memory region). According to this, when downlink data of the URLLC actually occurs, division of the slave soft buffer based on the division number is performed, and each of the soft buffers which are divided can be used for each HARQ process. Furthermore, each of the soft buffers which are divided may be referred to as a sub-buffer. Furthermore, at the point of the partitioning setting, division processing of the slave soft buffer may be performed. For example, the division processing includes division of a memory region of the slave soft buffer by the division number, and allocation of a HARQ process number to each of regions which are divided.

In step S102 in FIG. 3, downlink control information including resource allocation of downlink data of the URLLC is transmitted from the base station 20 to the user equipment 10.

When grasping occurrence of the downlink data of the URLLC on the basis of the downlink control information, the user equipment 10 performs division of the slave soft buffer, allocates a HARQ process number (index) to each of the soft buffers which are divided, and starts use of the soft buffer (step S103). Then, a HARQ control, which uses each of the soft buffers which are divided, is executed with respect to the downlink data of the URLLC. In the HARQ control (retransmission control), as described above, for example, detecting an error in the downlink data, the user equipment 10 performs processing of retaining the downlink data in a corresponding soft buffer, returning NACK to the base station 20, combining retransmission data that is received from the base station 20 and the downlink data that is retained in the soft buffer, and decoding the combined data.

Here, after setting of the slave soft buffer is performed, the user equipment 10 exclusively uses the slave soft buffer for the URLLC. During a communication of the URLLC by the user equipment 10, a communication of the eMBB may also be performed in parallel. However, in this case, a region obtained by excluding the slave soft buffer from the master soft buffer is used with respect to the communication of the eMBB (in an example in FIG. 2(b), regions of the HARQ processes #1 to #3).

Furthermore, the above-described example illustrates an aspect in which a buffer corresponding to one HARQ process in the master soft buffer is divided and is used as the slave soft buffer, but this aspect is illustrative only. Buffers corresponding to a plurality of the HARQ processes in the master soft buffer may be divided and may be used as the slave soft buffer.

In addition, in a case where the slave soft buffer is not set in the user equipment 10, a common soft buffer is shared without depending on the type of the downlink data. For example, the soft buffer illustrated in FIG. 2(a) is commonly used between the eMBB and the URLLC. Accordingly, for example, when respective soft buffers of the HARQ processes #1 to #4 illustrated in FIG. 2(a) are fragmentally used by data of the URLLC, deficiency of a soft buffer for the eMBB may occur.

Accordingly, it is preferable that the base station 20 in a cell, in which both the eMBB and the URLLC may occur, performs configuration of the slave soft buffer with respect to the user equipment 10 capable of dealing with both the eMBB and the URLLC by higher layer signaling or a broadcast signal.

In addition, a soft buffer size that is used in the URLLC and/or the capability related to a maximum number of HARQ processes which are used in the URLLC may be reported to the base station 20 by the user equipment 10 in order for the base station 20 to configure an appropriate division number.

According to the above-described configuration, it is possible to avoid fragmentation of the soft buffer and deficiency of the soft buffer when the eMBB and the URLLC are mixed in.

(With Respect to Buffer Sharing)

In the above-described example, in a case where the slave soft buffer is configured, the user equipment 10 exclusively uses the slave soft buffer for the URLLC, and thus a buffer size for the eMBB decreases. To avoid this situation, the slave soft buffer may be shared with an eMBB (master side). A shared region is referred to as a shared buffer. Hereinafter, description will be given of an operation example related to the sharing.

Figure 4:
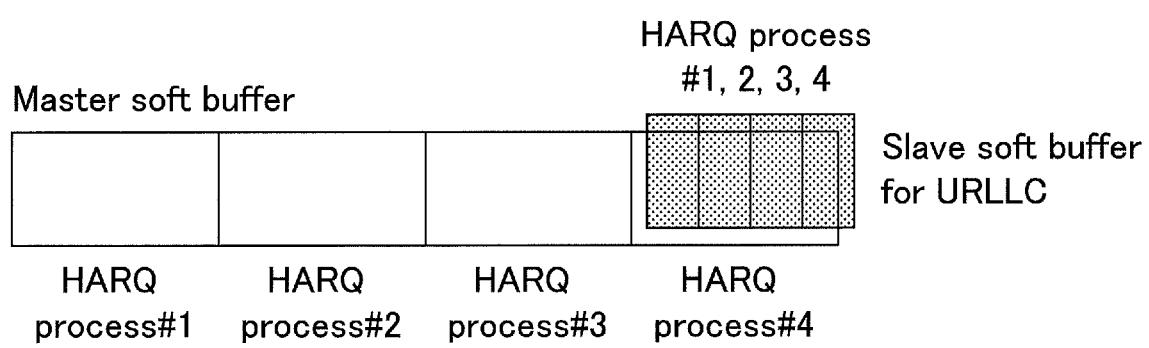
FIG. 4 is a view illustrating a shared buffer.

FIG. 4 illustrates an image of the shared buffer. In an example illustrated in FIG. 4, a soft buffer region of the HARQ process #4 in the master soft buffer is used as the shared buffer.

For example, in the configuration information in S101 illustrated in FIG. 3, the division number and the like may be designated, and instruction of sharing/exclusion may be given. In addition, the sharing may be always set without the instruction of the sharing/exclusion. In addition, the exclusion may be always set without the instruction of the sharing/exclusion.

Description will be given of an operation example of the user equipment 10 in a case where a shared buffer (for example, FIG. 4) is configured in the user equipment 10 with reference to FIG. 5.

In an example illustrated in FIG. 5, when downlink data transmission of the eMBB starts at a point of time A, the user equipment 10 subsequently performs HARQ control related to downlink data of the eMBB by using the soft buffers of the HARQ processes #1 to #4 in the master soft buffer (until reaching a point of time B).

At the point of time B, the user equipment 10 grasps occurrence of the downlink data of the URLLC by downlink control information. In this case, the user equipment 10 clears the soft buffer (slave soft buffer) of the HARQ process #4 in the master soft buffer, divides the buffer, and uses the buffers which are divided in the HARQ processes #1 to #4 of the URLLC. During that time, the downlink data of the eMBB may continue. In this case, the soft buffers of the HARQ processes #1 to #3 in the master soft buffer are used for the eMBB. However, during that time, in a case where eMBB downlink data, which is also necessary to use the HARQ process #4 in the master soft buffer, occurs, for example, the shared buffer (slave soft buffer) is cleared, and the shared buffer is used as a buffer of the HARQ process #4 of the eMBB. This is an operation in a case where priority of a buffer of the eMBB is high. The priority of the buffer of the URLLC may be set to be high in order for the shared buffer (slave soft buffer) not to be used for the eMBB until the downlink data of the URLLC is terminated.

In addition, a valid time (valid time counter) may be provided for use of the shared buffer for the URLLC in order for the priority of the buffer for the URLLC to be set to be high. In this case, for example, the user equipment 10 initiates the use of the shared buffer as the buffer for the URLLC at the point of time B in FIG. 5, activates the valid time counter, and initiates time measurement of a predetermined time. The shared buffer cannot be used as the buffer of the eMBB before a predetermined time has passed (before the valid time counter is time out). In addition, after the valid time counter is time out, in a case where eMBB downlink data, which needs to use the HARQ process #4 in the master soft buffer, occurs, the buffer for the URLLC is cleared, and is used for the eMBB. However, in a case where the eMBB downlink data, which needs to use the HARQ process #4 in the master soft buffer, does not occur, use of the buffer for the URLLC may continue.

Figure 5:
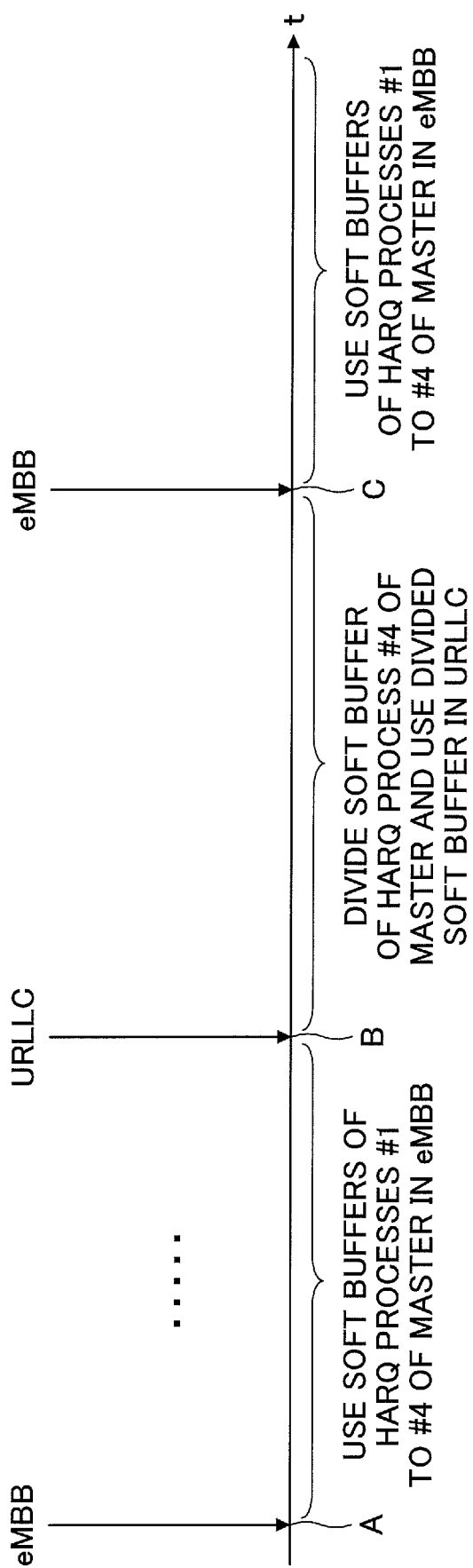
FIG. 5 is a view illustrating a buffer sharing operation.

In FIG. 5, assuming that the buffer for the URLLC is being used until reaching a point of time C, and that the downlink data of the URLLC is terminated at the point of time C, a downlink data communication of the eMBB, which uses the master soft buffer, is performed from the point of time C.

As described above, by providing the shared buffer, it is possible to perform data communication on the URLLC side while minimizing decrease in throughput on the eMBB side. Note that the configuration of the shared buffer may be made only in a case where throughput on the eMBB side is given higher priority than that for the URLLC side.

(With Respect to Transport Block Size)

In the partitioning setting of the slave soft buffer, the base station 20 may notify the user equipment 10 of the maximum transport block size per TTI of the URLLC downlink data through higher layer signaling.

For example, notification is made in a state in which the maximum transport block size is included in the configuration information in step S101 in FIG. 3. The user equipment 10, which receives the maximum transport block size, may determine the partitioning setting (division number and the like) in the slave soft buffer on the basis of the maximum transport block size.

In addition, the user equipment 10 may autonomously calculate the transport block size of the URLLC in correspondence with the size of the slave soft buffer.

For example, when the number of buffers, which are occupied by the slave soft buffer, in the master soft buffer is set to M (for example, in a case of using buffers of the HARQ processes #3 and #4 of the eMBB, the number of buffers is 2), the transport block size per TTI of the eMBB that is supported by the user equipment 10 is set to S, and the number of HARQ processes of the URLLC is set to N, the transport block size per TTI in the downlink data transmission (that is, URLLC downlink data transmission) corresponding to the slave soft buffer is obtained through calculation of "S×M/N".

As described above, in the example described so far, in a case where the slave soft buffer is used, the number of the HARQ processes, which use the master soft buffer, decreases. Here, for example, notification (change) of the maximum transport block size (size smaller than an original size) per HARQ process that uses the master soft buffer is given through the higher layer signaling from the base station 20 to the user equipment 10 in order for the number of the HARQ processes using the master soft buffer not to be changed. For example, the notification may be performed in a state of being included in the control information during configuration of the slave soft buffer in step S101 in FIG. 3.

Figure 6:
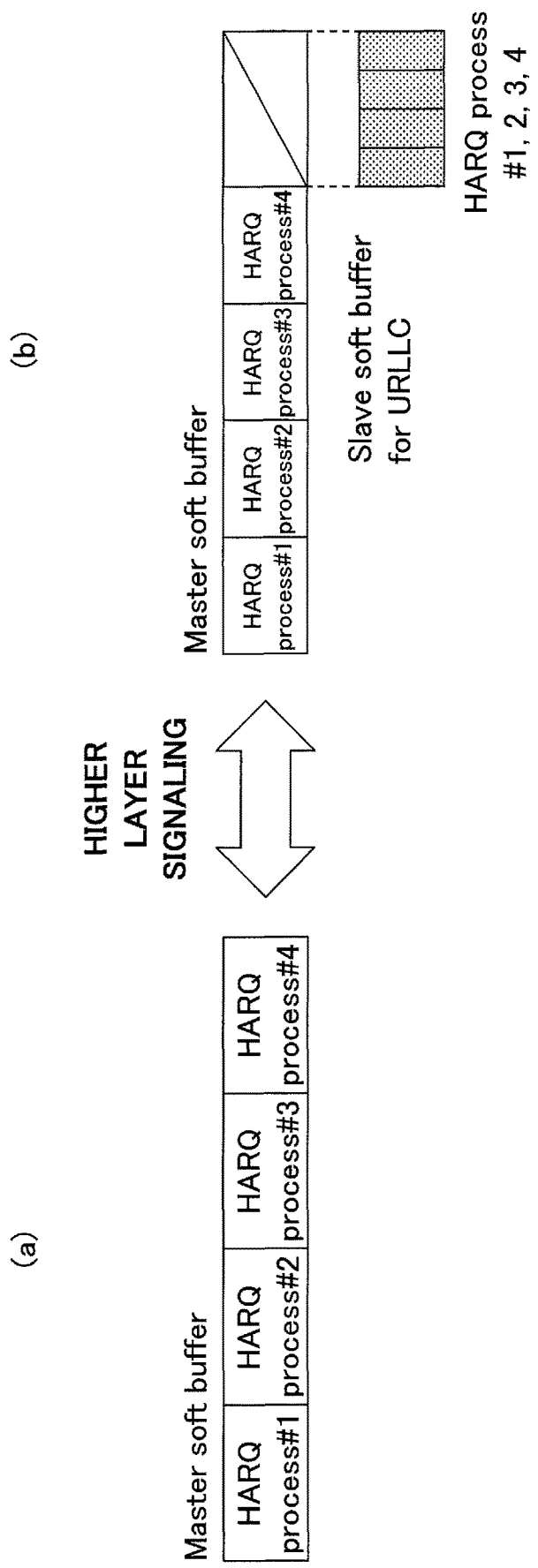
FIG. 6 is a view illustrating an example of a case where the number of HARQ processes is not changed in a master soft buffer.

As an example, when a buffer size capable of being used by the user equipment 10 (for example, a size of the master soft buffer in FIG. 6(*a*)) is set to B, the number of the HARQ processes using the master soft buffer is set to P, and a buffer size that is used in the slave soft buffer is set to K, the maximum transport block size (=a one-buffer size of the master soft buffer after changing) corresponding to the change can be calculated as (B−K)/P. For example, the base station 20 notifies the user equipment 10 of the maximum transport block size that is calculated as described above. Alternatively, the one-buffer size (=the transport block size of the master) of the master soft buffer may be calculated by the user equipment 10 by performing calculation without performing the notification.

FIG. 6(*b*) illustrates buffers including master soft buffer having the buffer size calculated as described above, and a slave soft buffer. As illustrated in FIG. 6(*b*), even in a case where the slave soft buffer is set, the number of the HARQ processes using the master soft buffer is not changed.

From the above-described operation, it is possible to avoid a delay increase in a data channel, which uses the master soft buffer, due to deficiency of the number of the HARQ processes.

(With Respect to Switching of Use Soft Buffer)

Figure 7:
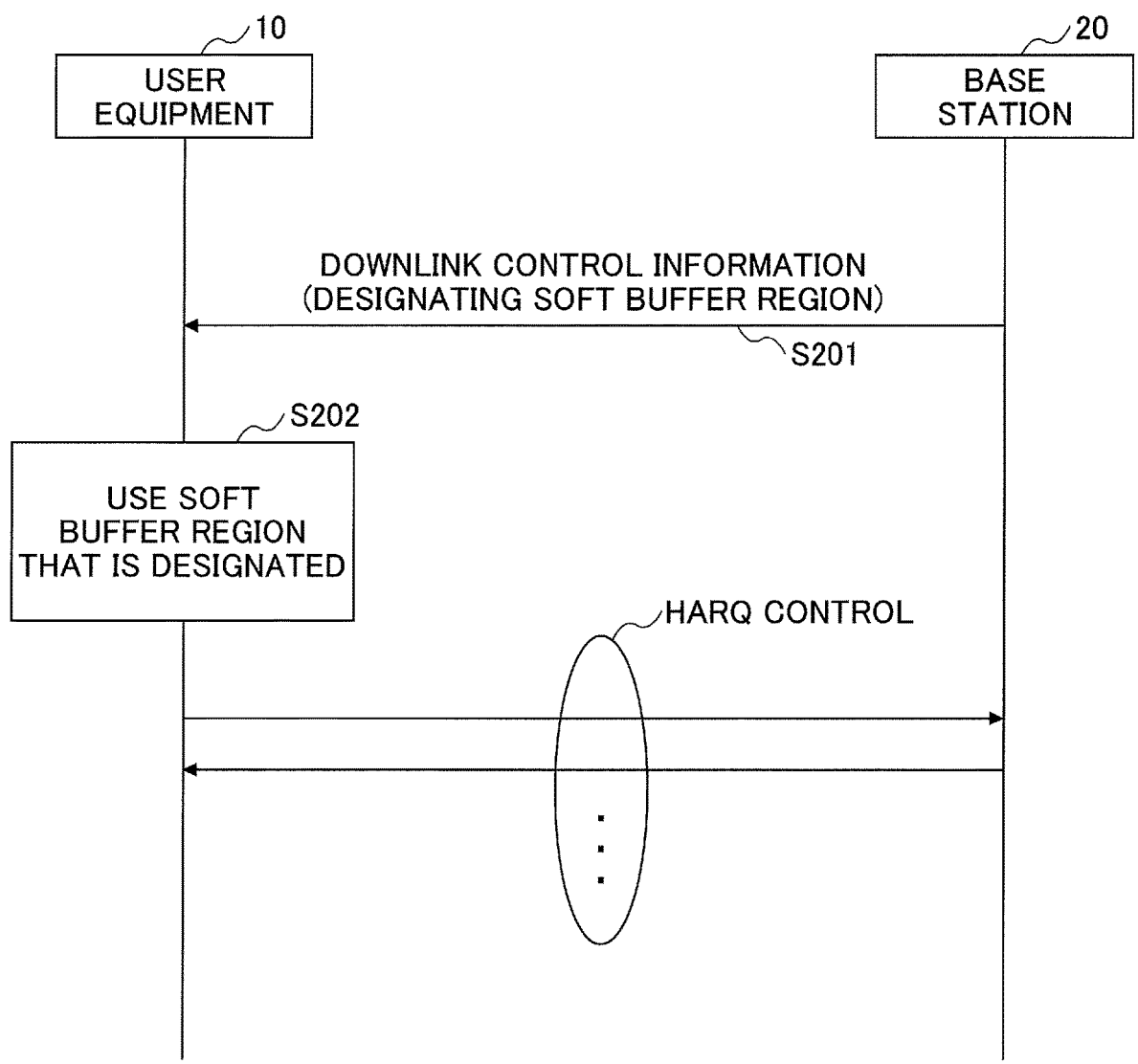
FIG. 7 is a view illustrating a sequence in a case where notification of a use soft buffer region is made by downlink control information.

As described above with reference to FIG. 3, when receiving downlink control information indicating resource allocation of downlink data of the URLLC (step S102 in FIG. 3), the user equipment 10 initiates use of the slave soft buffer. In this manner, in this embodiment, the user equipment 10 can make a determination of using either the master soft buffer or the slave soft buffer on the basis of the downlink control information. A sequence example of the processing is the same as illustrated in FIG. 7. That is, when receiving the downlink control information that designates the soft buffer region from the base station 20 (S201), the user equipment 10 can determine a soft buffer region that is designated (step S202).

For example, the above-described determination can be realized by explicitly applying identification information indicating "use of the master soft buffer" or "use of the slave soft buffer" to the downlink control information.

In addition, instead of the explicit application of the identification information (or in addition to the explicit application), any one or a plurality of a downlink control information format, an identifier that is applied to downlink control information, and a time and frequency index of a resource through which the downlink control information is transmitted may be associated with "use of the master soft buffer"/"use of the slave soft buffer" in advance. In this case, both the base station 20 and the user equipment 10 recognize a correspondence relationship in advance. Alternatively, the base station 20 may notify the user equipment 10 of the correspondence relationship by a broadcast signal (system information) and the like.

Then, the base station 20 transmits the downlink control information to the user equipment 10 by using a downlink control information format corresponding to "use of the master soft buffer" or "use of the slave soft buffer" and the like on the basis of scheduling contents (URLLC or the eMBB). The user equipment 10 executes reception of the downlink data by using a buffer region that is determined on the basis of the correspondence relationship.

According to the above-described method, it is possible to further reduce a signaling overhead in comparison to a case of explicitly adding the identification information.

In the above-described example, a soft buffer region (master or slave) that is used is designated by the downlink control information with respect to the user equipment 10. However, notification of the soft buffer for each HARQ process may be given for each scheduling by the downlink control information. According to this, it is possible to realize a more flexible soft buffer sharing.

At this time, with respect to the downlink data that uses the slave soft buffer, a soft buffer (slave soft buffer) corresponding to a HARQ process number (index) on a master side may be divided and used. When the resultant buffers which are divided are referred to as "sub-buffer", in a case where the user equipment 10 uses the slave soft buffer, the base station 20 may explicitly notify the user equipment 10 of indexes of the sub-buffers, or the user equipment 10 may implicitly recognize the indexes of the sub-buffers by a time and frequency resource of the downlink data which is obtained from the downlink control information.

A specific example will be described with reference to FIG. 8 and FIG. 9. FIG. 8 and FIG. 9 illustrate an example in which the master soft buffer includes soft buffers corresponding to four HARQ processes, and a soft buffer corresponding to the HARQ process #4 in the soft buffers is used as the slave soft buffer that is a shared buffer. In addition, FIG. 8 and FIG. 9 illustrate an example in a case where the user equipment 10 uses a soft buffer (for example, a sub-buffer #1) corresponding to the HARQ process #2 in the slave soft buffer.

An example of explicitly performing notification is illustrated in FIG. 8. As illustrated in FIG. 8, the base station 20 transmits downlink control information including "the HARQ process #4 and the sub-buffer #1" to the user equipment 10. The user equipment 10 uses the sub-buffer #1 among sub-buffers, which are divided, of a soft buffer of the HARQ process #4 in the master soft buffer in accordance with the downlink control information.

FIG. 9 illustrates an example in a case where the user equipment 10 determines a sub-buffer to be used on the basis of a time and frequency resource of downlink data. In the example illustrated in FIG. 9, it is assumed that 1TTI (corresponding to four scales on a time axis in FIG. 9) on a master side corresponds to 4TTI on a slave side. In this case, in a case of receiving allocation of a time and frequency resource indicated by A, the user equipment 10 determines to use the soft buffer of the HARQ process #1 in the master soft buffer because a time width of the resource is four, and the resource is a resource that is located foremost in a frame (square indicated by C in FIG. 9).

Furthermore, when receiving an allocation of a time and frequency resource indicated by B, the user equipment 10 determines to use the slave soft buffer (the soft buffer of the HARQ process #4 in the master soft buffer) because a time width of the resource is 1, and determines to use the soft buffer (=the sub-buffer #1) of the HARQ process #2 in the slave soft buffer because the resource is a resource of No. 2 in a time direction.

Note that, in the above-described example, the user equipment 10 divides the soft buffer region into two regions of master and slave, but this is illustrative only. The user equipment 10 may divide the soft buffer region into three or greater regions (for example, three regions including master, slave 1, and slave 2). In addition, as an example, the divided buffer (for example, slave 2) may be allocated to reception of a sidelink (also referred to as "D2D"). In this case, the user equipment 10 may autonomously switch a buffer in correspondence with a channel to be monitored (for example, depending on whether the channel is a downlink data channel or a sidelink data channel).

(With Respect to Selective Buffer Discarding)

Figure 10:
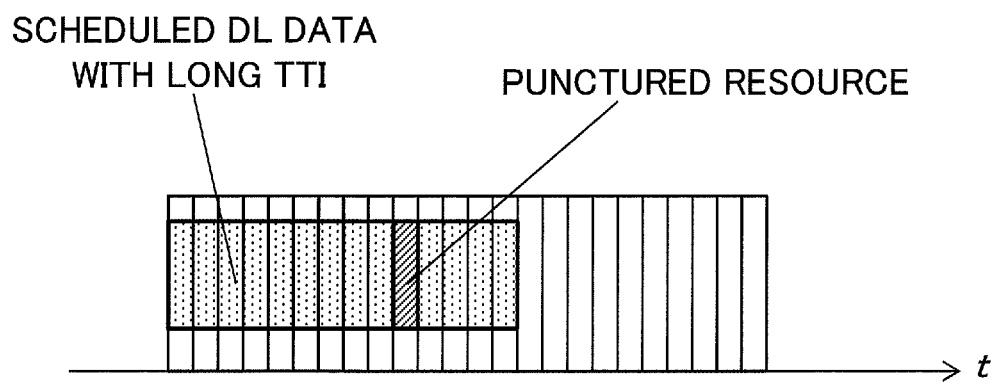
FIG. 10 is a view illustrating an accompanying problem.

As is the case with this embodiment, in a case where scheduling of downlink data with a different TTI length is permitted, particularly, in a case of performing low-latency transmission by using a short TTI similar to the URLLC, the following configuration is considered. Specifically, after resource allocation with respect to a transport block that is transmitted in a long TTI, a partial resource of a long TTI is allocated with respect to a transport block that is transmitted in a short TTI. In this case, for example, a part of a resource with a long TTI is punctured. A situation of this case is illustrated in FIG. 10.

As described above, in a case of performing puncture, a part of the transport block with a long TTI may be punctured in units of symbols, and there is a possibility that the user equipment 10 cannot receive one or a plurality of code blocks. Note that, on a transmission side (the base station 20 in this example) of the transport block, in a case where a transport block length is equal to or greater than a predetermined value, transmission is performed in a state in which the transport block is divided into a plurality of code blocks. In a case where the division is not performed, the transport block is transmitted as one code block.

As described above, in a case where a part of the resource that is allocated is punctured, soft decision information corresponding to the punctured resource is stored in the soft buffer. However, meaningful information is not included in the soft decision information corresponding to the punctured resource. Accordingly, in a case of performing combining of a packet that is retransmitted by using the soft decision information, a combining gain is not obtained, and the number of retransmission times may increase.

Figure 11:
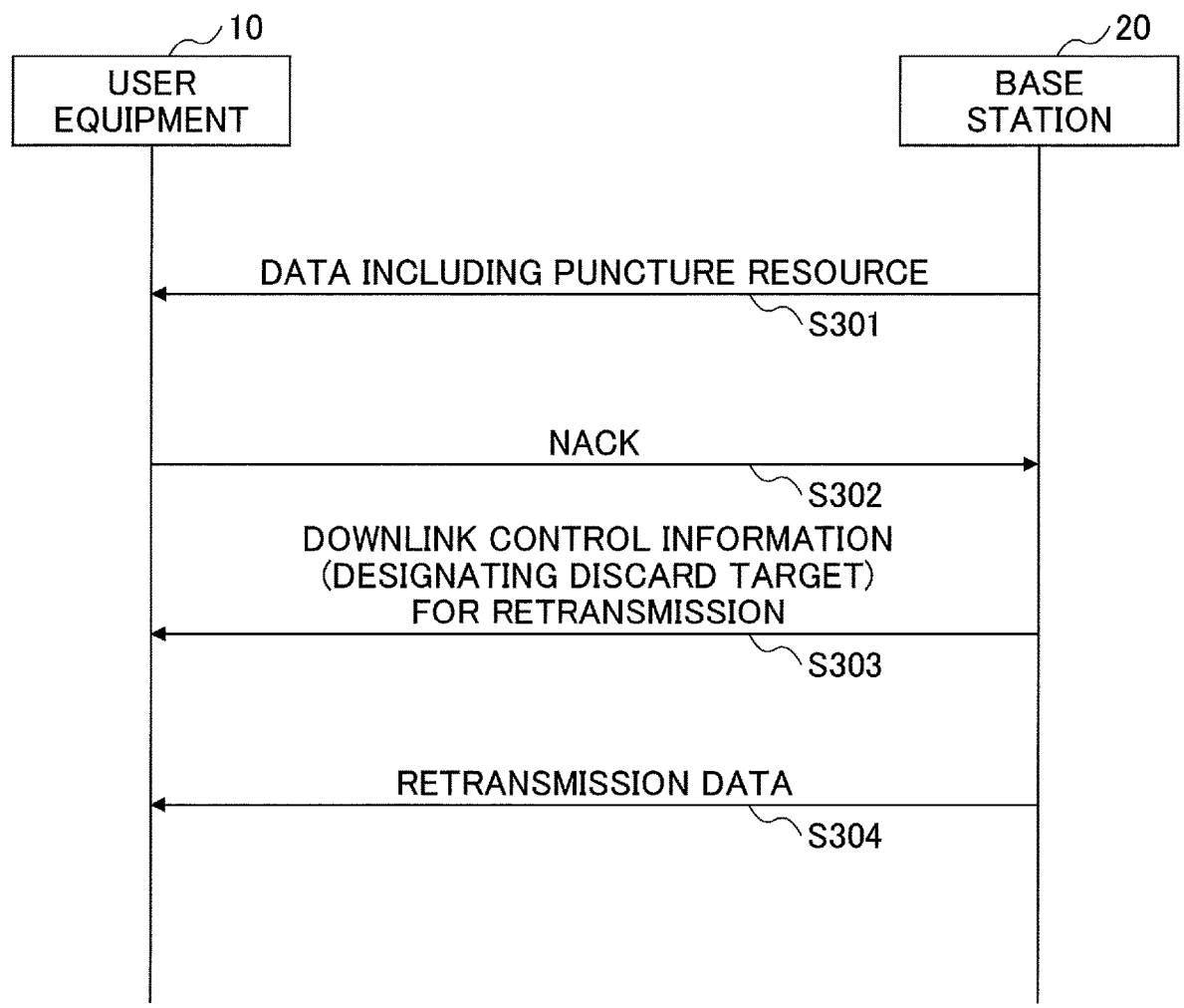
FIG. 11 is a view illustrating a sequence of performing selective buffer discarding.

Here, in this embodiment, in retransmission signaling that is given to the user equipment 10 in notification from the base station 20, instruction of partial discarding of the soft decision information in previous transmission is given. FIG. 11 illustrates an example of a processing sequence.

In step S301, data (for example, a code block) including the punctured resource is transmitted from the base station 20 to the user equipment 10. The base station 20 grasps that which resource (which portion of data) is punctured.

The user equipment 10, which receives the data, returns NACK to the base station 10 (step S302). The base station 20 transmits downlink control information including resource allocation of the retransmission data to the user equipment 10 with a downlink control channel (step S303).

For example, the downlink control information includes a symbol index, a time and frequency resource index, or a code block index as information indicating a discard target. As the information indicating a discard target, information other than the above described indexes may be included.

The user equipment 10, which receives the downlink control information, deletes information of the discard target from the soft buffer. In step S304, retransmission data is transmitted from the base station 20 to the user equipment 10, and the user equipment 10 performs decoding of the retransmission data.

In addition to the downlink control information in step S303, the base station 20 may notify the user equipment 10 of RV (RV in previous scheduling) of data that is a discard target. According to this, it is possible to avoid erroneously discarding information of a buffer region when a detection error occurs with respect to scheduling information (downlink control information). Note that, the RV is an abbreviation of redundancy version, and indicates a leading position of a circular buffer when fetching a transmission code bit from the circular buffer on a transmission side.

Figure 12:
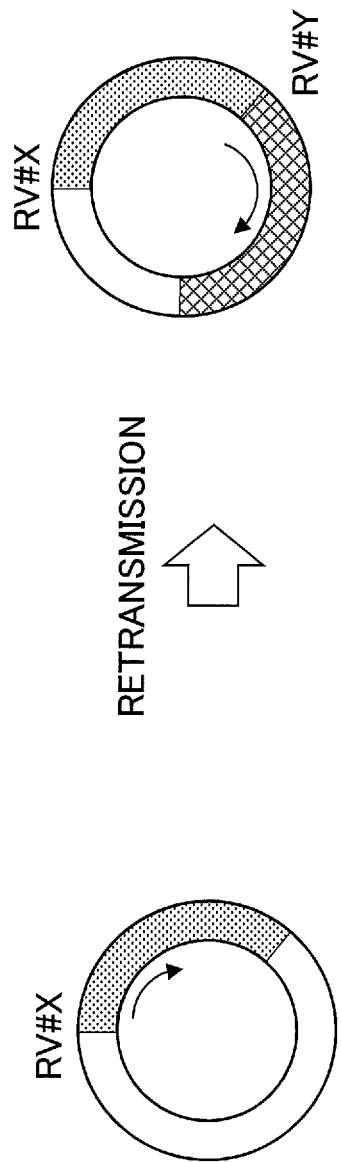
FIG. 12 is a view illustrating a buffer status.

In a case of performing the discarding in units of code blocks, the base station 20 may apply different RVs for a code block that is a discard target and a code block other than that. An operation example will be described with reference to FIG. 12 and FIG. 13. FIG. 12 is a view illustrating retransmission of a code block without puncture for comparison with FIG. 13. FIG. 12 illustrates a configuration in which a code block of RV#X is transmitted from the base station 20, and a code block of RV#Y is transmitted as retransmission.

Figure 13:
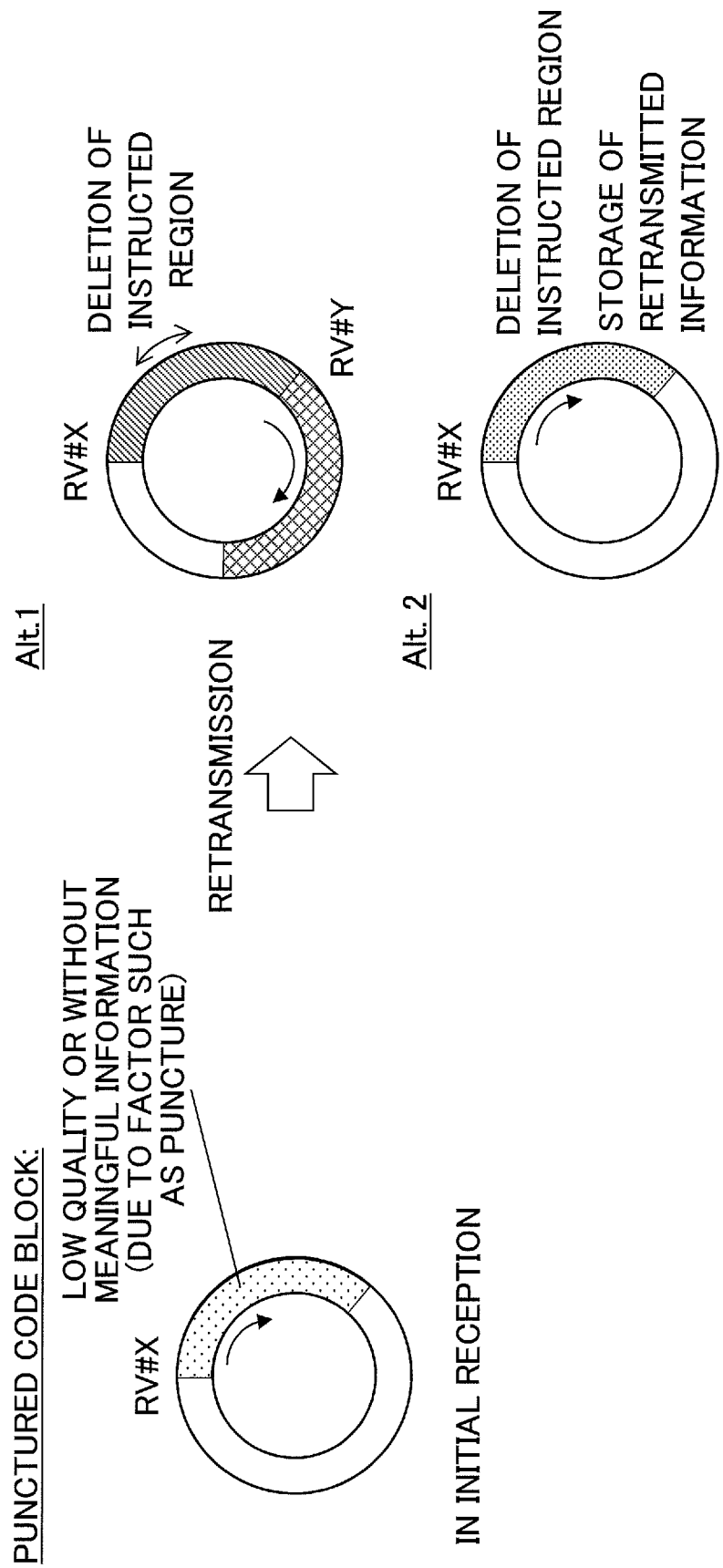
FIG. 13 is a view illustrating a buffer status.

In an example illustrated in FIG. 13, the code block of RV#X related to initial transmission (initial reception of the user equipment 10) is punctured, and has low quality (or has no meaningful information). The user equipment 10 retains soft decision information of the code block of RV#X in the soft buffer through initial reception.

In ALT. 1 of retransmission as illustrated in FIG. 13, the user equipment 10 deletes a region of the code block of RV#X from the soft buffer in response to a discarding instruction described above, and retains a retransmitted code block in a soft buffer region corresponding to RV#Y. In this case, the downlink control information in step S303 illustrated in FIG. 11 includes RV(RV#X) of delete target, and RV(RV#Y) of retransmission data, and thus the user equipment 10 can identify RV#X and RV#Y. According to this, in a case of coding in which an error rate in initial transmission is different in accordance with RV, it is possible to perform retransmission using optimal RV.

In ALT. 2 of retransmission as illustrated in FIG. 13, the user equipment 10 deletes a region of the code block of RV#X from the soft buffer in response to a discarding instruction, applies RV (here, RV#X), which is notified in previous scheduling to a retransmitted code block, and retains the retransmitted code block in a soft buffer region corresponding to RV#X.

Note that, in the above-described example, deletion and storage with respect to the region related to the circular buffer are performed, but this configuration is illustrative only. Information of a specific data region (for example, a region of a code block for which a deletion instruction is given) in the soft buffer may be deleted, and retransmission data may be stored in a separate region (corresponding to the ALT. 1) regardless of the circular buffer. In addition, information of a specific data region (for example, the region of the code block for which the deletion instruction is given) in the soft buffer may be deleted, and the retransmission data may be stored in the region (corresponding to the ALT. 2).

(Device Configuration)

Description will be given of a functional configuration example of the user equipment 10 and the base station 20 which execute the operation of the embodiment as described above.

<User Equipment>

Figure 14:
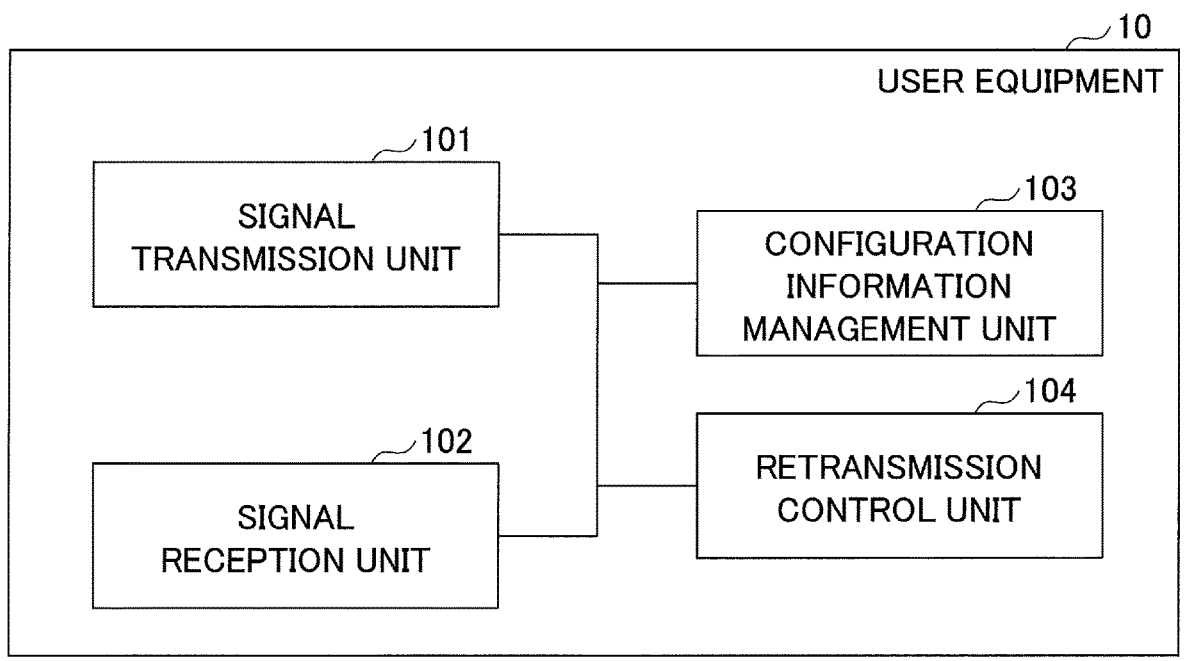
FIG. 14 is a view illustrating an example of a functional configuration of a user equipment 10.

FIG. 14 is a view illustrating an example of a functional configuration of the user equipment 10 according to the embodiment. As illustrated in FIG. 14, the user equipment 10 includes a signal transmission unit 101, a signal reception unit 102, a configuration information management unit 103, and a retransmission control unit 104. The functional configuration illustrated in FIG. 14 is illustrative only. A functional classification or the name of the functional units may be arbitrarily set as long as the operation according to the embodiment can be executed.

The signal transmission unit 101 creates a transmission signal, and wirelessly transmits the signal. In addition, the signal transmission unit 101 also performs transmission of a HARQ feedback and the like on the basis of an instruction from the retransmission control unit 104. The signal reception unit 102 includes a function of wirelessly receiving various signals and acquiring a signal of a further higher layer from a signal of a physical layer which is received. In addition, the signal reception unit 102 includes a storage unit that stores the soft buffer region. In addition, the signal reception unit 102 performs reception of downlink control information, reception of higher layer signaling, reception of a broadcast signal, reception of DL data, and the like.

The configuration information management unit 103 stores various pieces of configuration information and control information which are received from the base station 20 by the signal reception unit 102. For example, the configuration information includes partitioning configuration information, and the retransmission control unit 104 can perform division of the slave soft buffer with reference to the information.

The retransmission control unit 104 divides a partial region of the soft buffer region into a plurality of sub-buffer regions, and performs a retransmission control of downlink data, which is received from the base station, by using one or a plurality of sub-buffer regions among the plurality of sub-buffer regions. In the retransmission control, for example, when detecting an error in the downlink data, the retransmission control unit 104 retains the downlink data in the soft buffer (for example, a sub-buffer), returns NACK to the base station through the signal transmission unit 101, and performs combining of the retransmission data that is received from the base station and the data that is retained in the soft buffer.

<Base Station 20>

Figure 15:
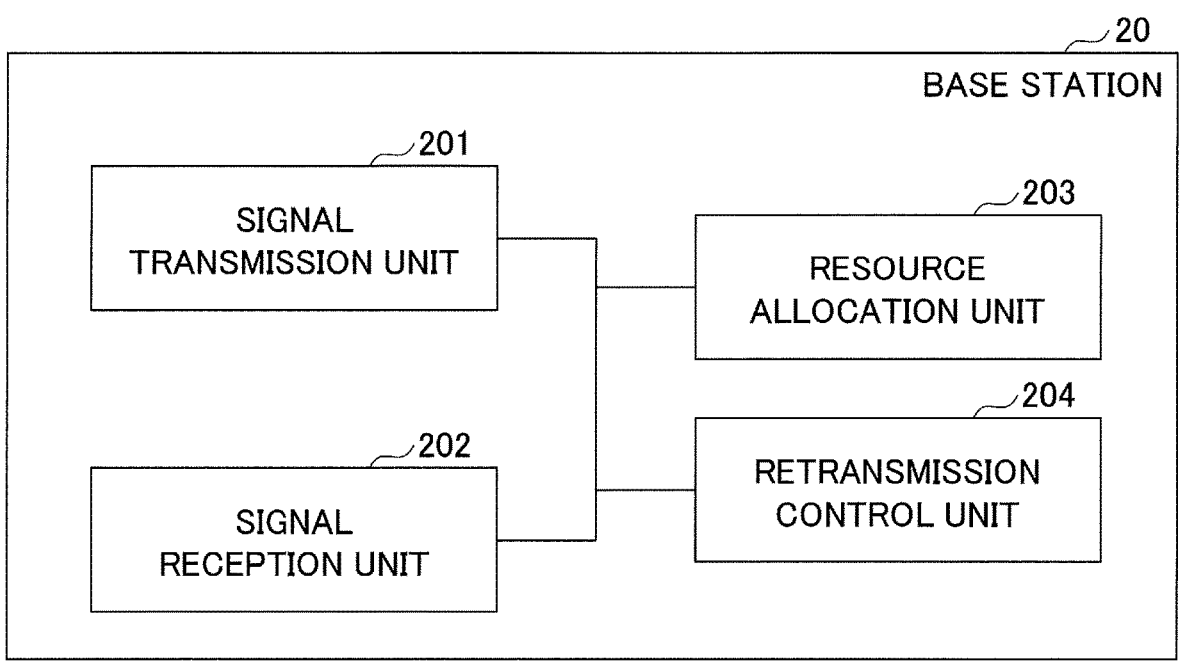
FIG. 15 is a view illustrating an example of a functional configuration of a base station 20.

FIG. 15 is a view illustrating an example of a functional configuration of the base station 20 according to this embodiment. As illustrated in FIG. 15, the base station 20 includes a signal transmission unit 201, a signal reception unit 202, a resource allocation unit 203, and a retransmission control unit 204. The functional configuration illustrated in FIG. 15 is illustrative only. A functional classification or the name of the functional units may be arbitrarily set as long as the operation according to the embodiment can be executed.

The signal transmission unit 201 includes a function of generating a signal to be transmitted to a user equipment 10 side, and wirelessly transmitting the signal. The signal reception unit 202 includes a function of receiving various signals which are transmitted from the user equipment 10, and acquiring information of, for example, a further higher layer. In addition, the signal reception unit 202 receives a HARQ feedback that is transmitted from the user equipment 10, and performs retransmission of data as necessary on the basis of an instruction from the retransmission control unit 204.

The resource allocation unit 203 performs resource allocation with respect to downlink data, and the like, and performs creation of downlink control information that is transmitted by a downlink control channel, and the like. The information, which is created, is transmitted from the signal transmission unit 201. The retransmission control unit 204 performs retransmission control processing on a base station 20 side.

<Hardware Configuration>

The block diagrams (FIG. 14 and FIG. 15) which are used in description of the embodiment illustrate blocks of a function unit. The function blocks (constituent units) are realized by an arbitrary combination of hardware and/or software. In addition, means for realizing respective function blocks is not particularly limited. That is, the respectively function block may be realized by one device in which a plurality of elements are physically and/or logically combined. In addition, two or greater devices, which are physically and/or logically separated from each other, may be directly and/or indirectly (for example, wire and/or wirelessly) connected, the respective function blocks may be realized by a plurality of the devices.

Figure 16:
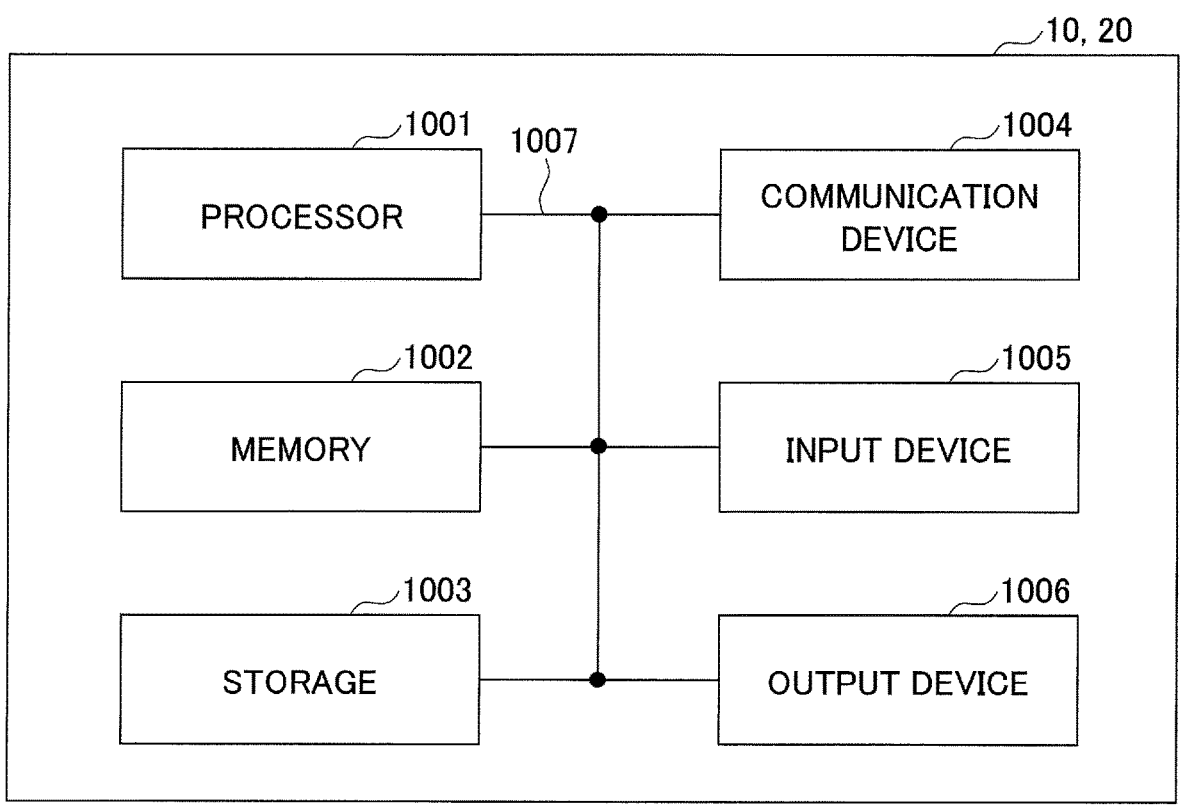
FIG. 16 is a view illustrating an example of a hardware configuration of the user equipment 10 and the base station 20.

For example, the user equipment 10 and the base station 20 in the embodiment of the invention may function as a computer that performs processing according to the embodiment. FIG. 16 is a view illustrating an example of a hardware configuration of the user equipment 10 and the base station 20 according to this embodiment. The user equipment 10 and the base station 20 may be configured as a computer device that physically includes a processor 1001, a memory 1002, a storage 1003, a communication device 1004, an input device 1005, an output device 1006, a bus 1007, and the like.

Furthermore, in the following description, a term "device" may be substituted with a circuit, a device, a unit, and the like. The hardware configuration of the user equipment 10 and the base station 20 may include the respective devices, which are indicated by reference numerals 1001 to 1006 in the drawing, one by one or in a plural number, or may not include a part of the devices.

Respective functions in the user equipment 10 and the base station 20 are realized by reading predetermined software (program) in hardware such as the processor 1001 and the memory 1002 so as to allow the processor 1001 to perform an arithmetic operation, and by controlling a communication by the communication device 1004, and reading-out and/or input of data in the memory 1002 and the storage 1003.

For example, the processor 1001 allows an operating system to operate so as to control the entirety of the computer. The processor 1001 may be constituted by a central processing unit that includes an interface with a peripheral device, a control device, an arithmetic operation device, a register, and the like.

In addition, the processor 1001 reads out a program (program code), a software module, or data from the storage 1003 and/or the communication device 1004 into the memory 1002, and performs various kinds of processing according to the program, the software, or the data. As the program, a program, which allows the computer to execute at least a part of the operations described in the embodiment, is used. For example, the signal transmission unit 101, the signal reception unit 102, the configuration information management unit 103, and the retransmission control unit 104 of the user equipment 10 may be realized by a control program that is stored in the memory 1002 and is operated by the processor 1001. In addition, the signal transmission unit 201, the signal reception unit 202, the resource allocation unit 203, and the retransmission control unit 204 of the base station 20 may be realized by a control program that is stored in the memory 1002 and is operated by the processor 1001. The above-described various kinds of processing are described to be executed by one processor 1001, but may be simultaneously or sequentially executed by two or greater processors 1001. The processor 1001 may be mounted by one or greater chips. Note that, the program may be transmitted from a network through electric communication line.

The memory 1002 is a computer-readable recording medium, and may be constituted by, for example, at least one of a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), and the like. The memory 1002 can retain a program (program code), a software module, and the like which can be executed to carry out processing the embodiment of the invention.

The storage 1003 is a computer-readable recording medium, and may be constituted by at least one, for example, among an optical disc such as a compact disc ROM (CD-ROM), a hard disk drive, a flexible disk, a magneto-optical disc (for example, a compact disc, a digital multi-purpose disc, and a Blue-ray (registered trademark) disc), a smart card, a flash memory (for example, a card, a stick, a key drive), a floppy (registered trademark) disk, a magnetic strip, and the like. The storage 1003 may be referred to as an auxiliary storage device. For example, the above-described storage medium may be database including the memory 1002 and/or the storage 1003, a server, and other appropriate media.

The communication device 1004 is hardware (transmission and reception device) that performs a communication between computers through wire and/or radio network, and may be referred to as, for example, a network device, a network controller, a network card, a communication module, and the like. For example, the signal transmission unit 101 and the signal reception unit 102 of the user equipment 10 may be realized by the communication device 1004. In addition, the signal transmission unit 201 and the signal reception unit 202 of the base station 20 may be realized by the communication device 1004.

The input device 1005 is an input device (for example, a keyboard, a mouse, a microphone, a switch, a button, a sensor, and the like) that receives an input from the outside. The output device 1006 is an output device (for example, a display, a speaker, an LED lamp, and the like) that performs output to the outside. Furthermore, the input device 1005 and the output device 1006 may have an integral configuration (for example, a touch panel).

In addition, respective devices including the processor 1001, the memory 1002, and the like are connected to each other through a bus 1007 for an information communication. The bus 1007 may be configured as a single bus, or may be configured as a bus that is different between devices.

In addition, the user equipment 10 and the base station 20 may include hardware such as a microprocessor, a digital signal processor (DSP), an application specific integrated circuit (ASIC), a programmable logic device (PLD), and a field programmable gate array (FPGA), or a part or the entirety of respective function blocks may be realized by the hardware. For example, the processor 1001 may be mounted by least one piece of hardware.

Summary of Embodiment

As described above, according to the embodiment, there is provided a user equipment in a radio communication system including a base station and the user equipment. The user equipment includes: a storage unit that includes a soft buffer region that is used in a retransmission control of downlink data that is received from the base station; and a retransmission control unit that divides a partial region of the soft buffer region into a plurality of sub-buffer regions, and performs the retransmission control of the downlink data that is received from the base station by using one or a plurality of sub-buffer regions among the plurality of sub-buffer regions.

According to the above-described configuration, it is possible to avoid deficiency of the soft buffer region that is used in the retransmission control in the user equipment that performs processing of a plurality of kinds of communications.

The user equipment may further include a reception unit that receives downlink control information, which includes resource allocation of the downlink data, from the base station, and the retransmission control unit may determine a region, which is used in the retransmission control of the downlink data that is transmitted with the resource, in the soft buffer region on the basis of the downlink control information. According to this, the user equipment can rapidly determine a region suitable for the downlink data.

The retransmission control unit may perform a retransmission control of first downlink data by using a buffer region that is obtained by excluding the partial region from the soft buffer region, and may perform a retransmission control of second downlink data, of which a transmission time interval is shorter than a transmission time interval of the first downlink data, by using the one or the plurality of sub-buffer regions. According to this configuration, in the user equipment that performs processing of a communication according to the first downlink data and a communication according to the second downlink data, it is possible to avoid deficiency of the soft buffer region that is used in the retransmission control.

The retransmission control unit may delete first data stored in the buffer region on the basis of an instruction from the base station, and stores first data that is retransmitted from the base station in the buffer region. According to this configuration, for example, even in a case where a resource of initial first data is punctured, it is possible to rapidly execute decoding of the first data.

Supplement of Embodiment

Information notification may be performed by other methods without limitation to the aspect and the embodiment which are described in this specification. For example, the information notification may be executed by physical layer signaling (for example, downlink control information (DCI) and uplink control information (UCI)), higher layer signaling (for example, RRC signaling, MAC signaling, broadcast information (master information block (MIB), system information block (SIB))), other signals, or a combination thereof. In addition, the RRC message may be referred to as RRC signaling. In addition, for example, the RRC message may be an RRC connection setup message, an RRC connection reconfiguration message, and the like.

The aspect and the embodiment which are described in this specification may also be applied to long term evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), other systems which use a suitable system, and/or a next generation system that is extended on the basis of the systems.

Information, which is input or output, may be stored in a specific location (for example, a memory), or may be managed by a management table. The information that is input or output, and the like may be subjected to rewriting, updating, or additional writing. The information, which is output, and the like may be deleted. The information, which is input, and the like may be transmitted to other devices.

Decision or determination may be performed by a value (0 or 1) that is expressed by one bit, may be performed in accordance with Boolean (true or false), or may be performed through numerical value comparison (for example, comparison with a predetermined value).

The information, the signals, and the like, which are described in this specification, may be expressed by using any one of other various technologies. For example, data, information, a signal, a bit, a symbol, and the like, which are stated over the entirety of the above description, may be expressed by a voltage, a current, an electromagnetic wave, a magnetic field or a magnetic particle, a photo field or a photon, or an arbitrary combination thereof.

Furthermore, terms described in this specification and/or terms necessary for understanding of this specification may be substituted with terms having the same or similar meaning. For example, the channel and/or the symbol may be a signal. In addition, the signal may be a message.

The user equipment may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other suitable terms by those skilled in the art.

In the procedure, the sequence, and the like in the aspect and the embodiment which are described in this specification, the order thereof may be changed as long as inconsistency does not occur. For example, with regard to the method that is described in this specification, elements of various steps are suggested in an exemplary order, and there is no limitation to the specific order that is suggested.

The aspect and the embodiment which are described in this specification may be used alone or in combination thereof, or may be switched and used in accordance with execution. In addition, notification of predetermined information (for example, notification of "a fact of X") is not limited to the explicit notification, and may be performed in an implicit manner (for example, notification of the predetermined information is not performed).

The term "determining" that is used in this specification may include various operations. For example, the term "determining" may include regarding of calculating, computing, processing, deriving, investigating, looking up (for example, looking up in a table, a database, or other data structures), or ascertaining as "determined", and the like. In addition, the "determining" may include regarding of receiving (for example, information receiving), transmitting (for example, information transmitting), input, output, or accessing (for example, accessing to data in a memory) as "determined", and the like. In addition, "determining" may include regarding of resolving, selecting, choosing, establishing, comparing, or the like as "determining". That is, "determining" includes regarding of any operation as "determined".

Description of "on the basis of" in this specification does not represent "only on the basis of" unless otherwise stated. In other words, description of "on the basis of" represents both "only on the basis of" and "at least on the basis of".

Hereinbefore, the invention has been described in detail, but it is apparent that the invention is not limited to the above-described embodiment in this specification. The invention can be executed a variation aspect and a modification aspect without departing from the gist or the scope of the invention which is determined by description of the appended claims. Accordingly, description in this specification is made for exemplary explanation, and does not have any limiting meaning with respect to the invention.

The present patent application claims priority based on Japanese patent application No. 2016-158263, filed in the JPO on Aug. 10, 2016, and the entire contents of the Japanese patent application No. 2016-158263 are incorporated herein by reference.

EXPLANATIONS OF LETTERS OR NUMERALS

UE: User equipment
eNB: Base station
101: Signal transmission unit
102: Signal reception unit
103: Setting information management unit
104: Retransmission control unit
201: Signal transmission unit
202: Signal reception unit
203: Resource allocation unit
204: Retransmission control unit
1001: Processor
1002: Memory
1003: Storage

1004: Communication device
1005: Input device
1006: Output device

The invention claimed is:

1. A user equipment in a radio communication system including a base station and the user equipment, the user equipment comprising:
   a memory that includes a soft buffer region that is used in a retransmission control of downlink data that is received from the base station; and
   a processor that divides a partial region of the soft buffer region into a plurality of sub-buffer regions, and performs the retransmission control of the downlink data that is received from the base station by using one or a plurality of sub-buffer regions among the plurality of sub-buffer regions,
   wherein the processor performs a retransmission control of first downlink data by using a buffer region that is obtained by excluding the partial region from the soft buffer region, and performs a retransmission control of second downlink data, of which a transmission time interval is shorter than a transmission time interval of the first downlink data, by using the one or the plurality of sub-buffer regions.

2. The user equipment according to claim 1, further comprising:
   a receiver that receives downlink control information, which includes resource allocation of the downlink data, from the base station,
   wherein the processor determines a region, which is used in the retransmission control of the downlink data that is transmitted with the resource, in the soft buffer region on the basis of the downlink control information.

3. The user equipment according to claim 1,
   wherein the processor deletes first data stored in the buffer region on the basis of an instruction from the base station, and stores first data that is retransmitted from the base station in the buffer region.

4. A retransmission control method that is executed by a user equipment in a radio communication system including a base station and the user equipment provided with a memory that includes a soft buffer region that is used in a retransmission control of downlink data, the retransmission control method comprising:
   dividing a partial region of the soft buffer region into a plurality of sub-buffer regions, and performing the retransmission control of the downlink data that is received from the base station by using one or a plurality of sub-buffer regions among the plurality of sub-buffer regions,
   wherein the user equipment performs a retransmission control of first downlink data by using a buffer region that is obtained by excluding the partial region from the soft buffer region, and performs a retransmission control of second downlink data, of which a transmission time interval is shorter than a transmission time interval of the first downlink data, by using the one or the plurality of sub-buffer regions.

* * * * *